United States Patent [19]

Notter

[11] 4,094,372
[45] June 13, 1978

[54] MOTORIZED SKATEBOARD WITH UNI-DIRECTIONAL REAR MOUNTING

[76] Inventor: Michael A. Notter, 115 Greenwood Ave., San Francisco, Calif. 94112

[21] Appl. No.: 772,647

[22] Filed: Feb. 28, 1977

[51] Int. Cl.² ............................................. B62D 51/02
[52] U.S. Cl. .............................. 180/1 G; 280/11.11 E
[58] Field of Search ................ 180/1 G; 280/11.11 R, 280/11.11 E, 87.04 A

[56] References Cited

U.S. PATENT DOCUMENTS

| 1,213,454 | 1/1917 | Brown | 280/87.04 A |
| 2,062,800 | 12/1936 | Shreffler | 280/87.04 A |
| 3,876,032 | 4/1975 | Ferino | 180/1 G X |

FOREIGN PATENT DOCUMENTS

| 276,137 | 4/1966 | Australia | 280/87.04 A |
| 1,390,198 | 1/1965 | France | 280/11.11 E |

OTHER PUBLICATIONS

Skateboarder, vol. 2, No. 6, Aug. 1976, "41st Avenue Skateboards", Moto-Board.

Primary Examiner—Joseph F. Peters, Jr.
Assistant Examiner—Michael Mar
Attorney, Agent, or Firm—Phillips, Moore, Weissenberger, Lempio & Majestic

[57] ABSTRACT

A skateboard comprises a rider's platform having pairs of front and rear wheels mounted thereunder. Front wheels are mounted for limited universal movement relative to the platform whereas the rear wheels are mounted under the platform solely for vertical pivot movements about a pivot axis disposed in a vertically disposed plane which intersects the longitudinal axis of the skateboard. A bracket is attached to the rear wheel mounting and has a motor secured thereon for selectively driving only one of the rear wheels via a stepped-down drive train and a centrifugally actuated clutch. A normally open kill-switch is mounted on a throttle control adapted to be grasped by a rider whereby a magneto of the engine may be grounded to stop the engine when desired.

16 Claims, 11 Drawing Figures

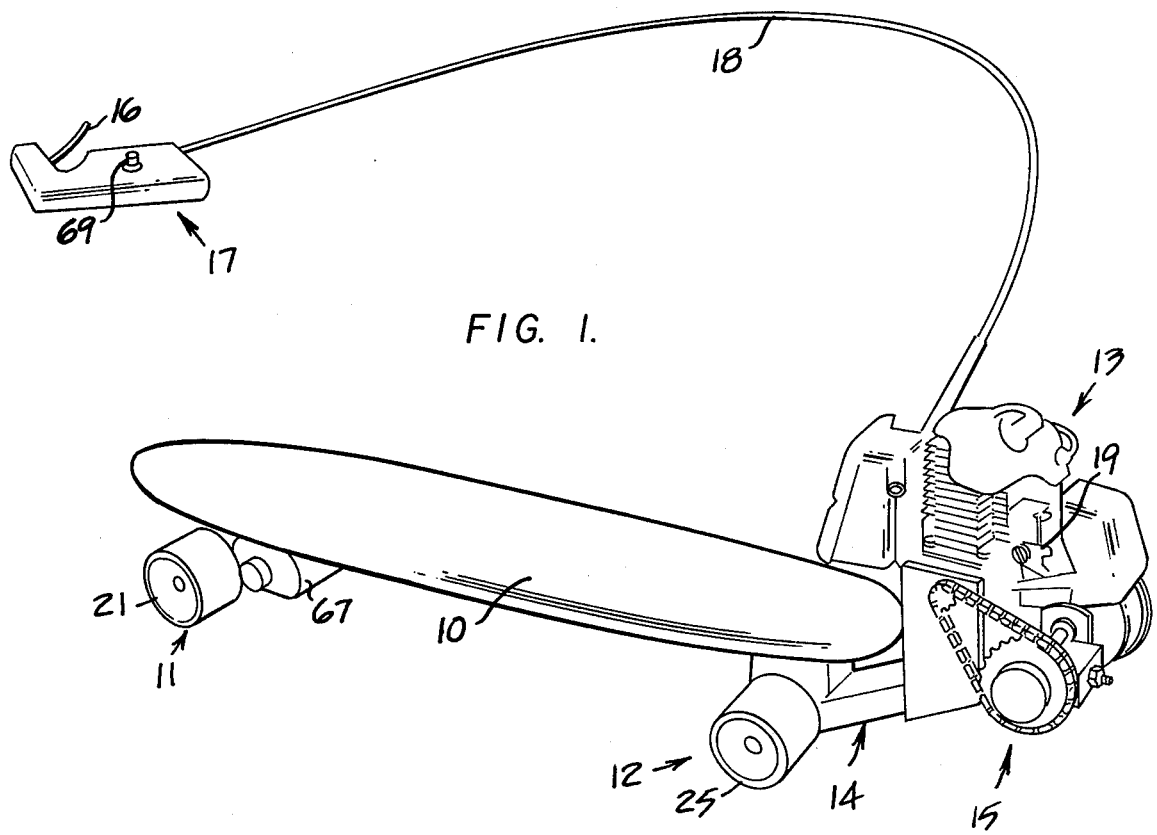
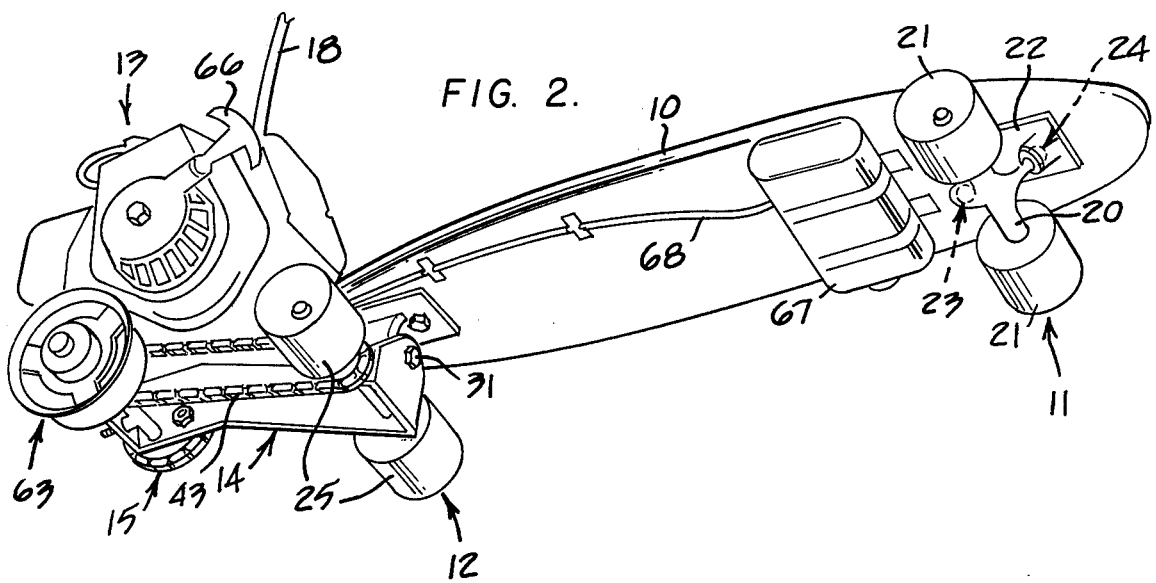

MOTORIZED SKATEBOARD WITH UNI-DIRECTIONAL REAR MOUNTING

BACKGROUND OF THE INVENTION

The popularity of skateboards has given rise to the desirability to mount a motor thereon whereby the skateboard becomes self-propelled. A conventional skateboard normally has pairs of front and rear wheels mounted thereunder for limited universal movement. Such mountings normally comprise a universal joint and an elastomeric bushing whereby both the front and rear wheels are adapted to pivot in an infinite number of planes. In addition to adversely affecting the drive characteristics transmitted to the driven rear wheel, the rear wheels tend to pivot in a horizontal plane which causes the rider's platform to wobble and become unstable and to also reduce needed traction of the rear wheels.

In addition, the motor mounted on the platform of a conventional skateboard normally drives one of the rear wheels by a single chain and a pair of sprockets to provide a relatively low drive ratio. Also, no centrifugal clutch or the like is employed in the drive train for a conventional motorized skateboard whereby throttle control must be regulated very carefully to prevent sudden accelerations or decelerations. Also, a kill-switch is normally not employed on the throttle control for a conventional motorized skateboard to stop the motor instantaneously should such become necessary.

SUMMARY OF THIS INVENTION

An object of this invention is to overcome the above, briefly described problems by providing a skateboard exhibiting improved ride characteristics. The skateboard comprises a horizontally disposed rider's platform and a pair of laterally spaced front wheels connected beneath a forward end of the platform and a pair of rear wheels. The rear wheels are mounted beneath a rearward end of the platform for solely permitting vertical pivotal movements of the rear wheels about a pivot axis disposed in a vertically disposed plane intersecting a longitudinal axis of the skateboard.

The skateboard is preferably motorized whereby drive input to one of the rear wheels will be at a maximum while yet permitting the rider to pivot the rear wheels for steering purposes. A motor is mounted on a bracket attached to the pivot mounting for the rear wheels and a stepped-down gear train, including a centrifugally actuated clutch, is preferably operatively connected between an output shaft of the motor and a rear drive axle for the driven rear wheel. In addition, a kill switch is preferably mounted on a throttle control of the pistol grip type whereby the engine may be stopped upon depression of the switch by the rider.

BRIEF DESCRIPTION OF THE DRAWINGS

Other objects of this invention will become apparent from the following description and accompanying drawings wherein:

FIG. 1 is a top perspective view of a motorized skateboard embodying this invention;

FIG. 2 is a bottom perspective view of the skateboard;

DETAILED DESCRIPTION

Figure 5:
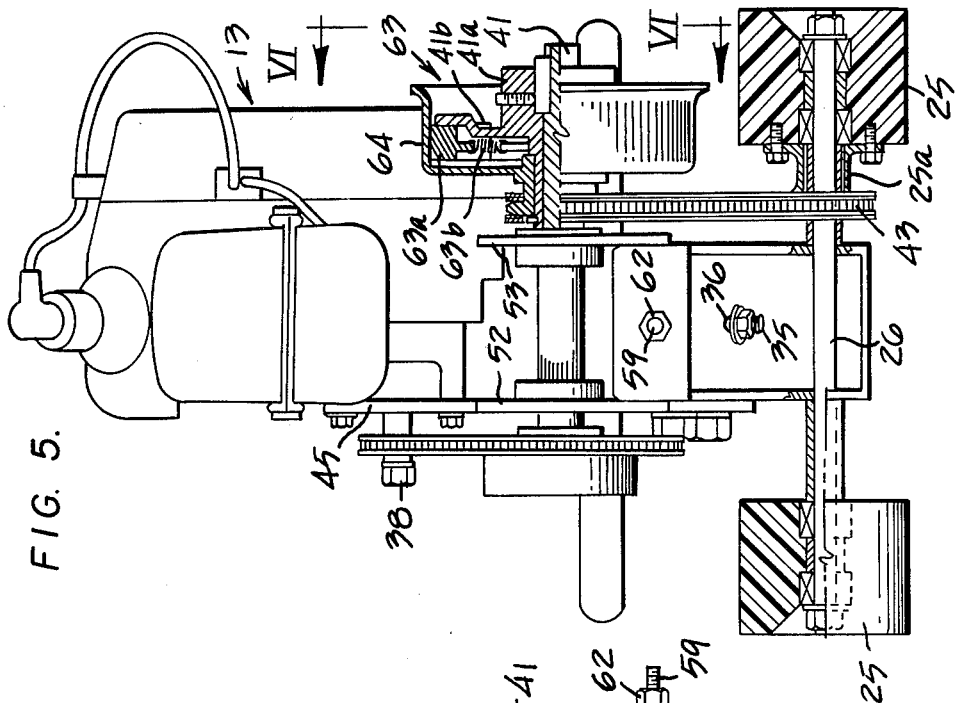
FIG. 5 is a rear elevational view of the skateboard, particularly showing the motor and drive train.

FIGS. 1 and 2 illustrate a motorized skateboard comprising a rider's platform 10 mounted on front and rear wheel assemblies 11 and 12, respectively. A motor 13 is mounted on a bracket 14, secured rearwardly on the platform, to selectively drive the rear wheels via a drive train, generally shown at 15. The throttle control lever 16 is pivotally mounted on a pistol-like grip 17, adapted to be held by a rider, to selectively vary engine speed via a throttle cable 18 attached to a throttle lever 19 of the engine.

Front wheel assembly 11 comprises a non-rotating axle 20 having a pair of front wheels 21 rotatably mounted on opposite ends thereof. Axle 20 is mounted on a bracket 22, secured beneath a forward end of platform 10, by a conventional ball and socket connection 23, including elastomeric bushings, and an elastomeric bushing mounting 24. As will be hereinafter more fully described, such mounting permits axle 20 and thus wheels 21 to have limited universal movement relative to platform 10 and a conventional skateboard has a like mounting attaching rear wheels thereof to a skateboard.

Figure 3:
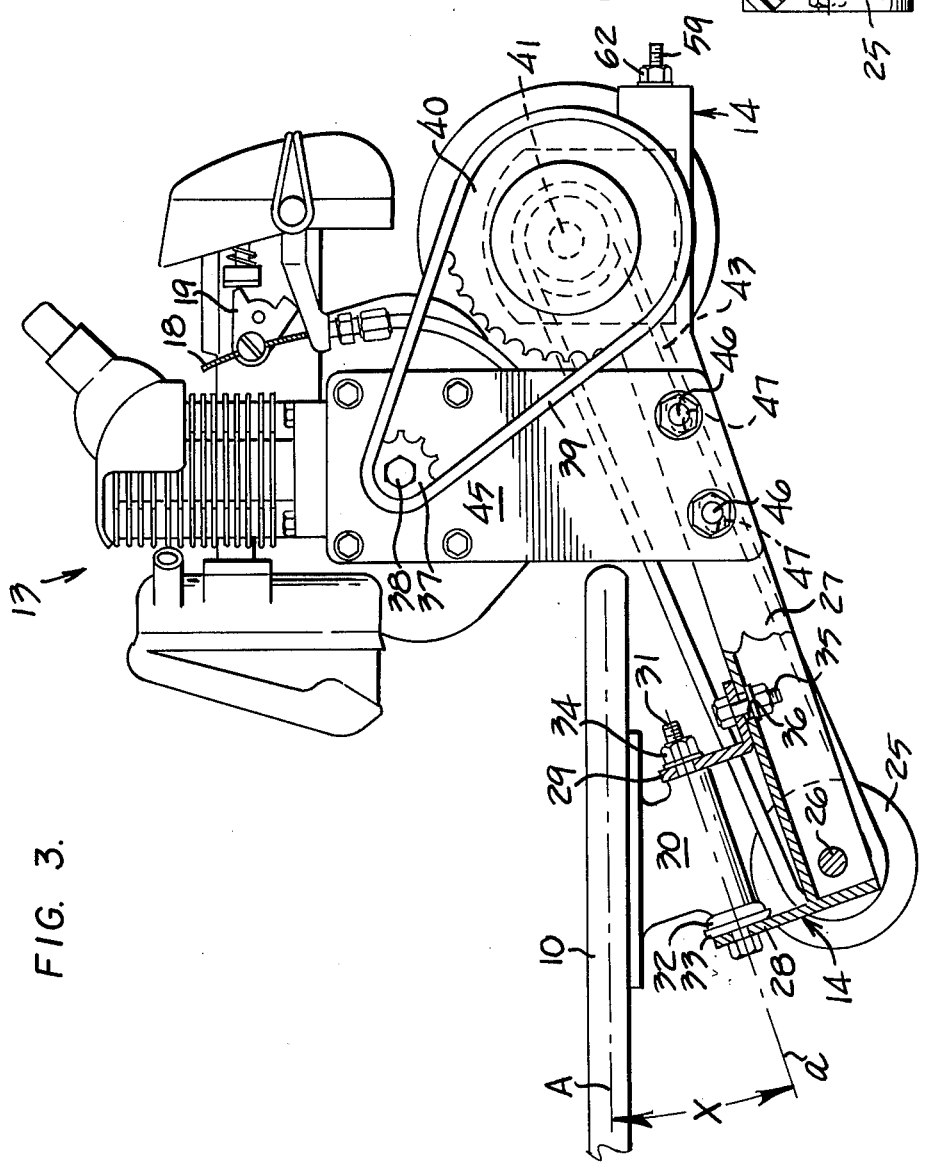
FIG. 3 is an enlarged side elevational view of a rearward end of the skateboard, illustrating a pivot mounting for rear wheels thereof and a motor mounted on the skateboard and adapted to drive one of the rear wheels via a stepped-down drive train.
Figure 4:
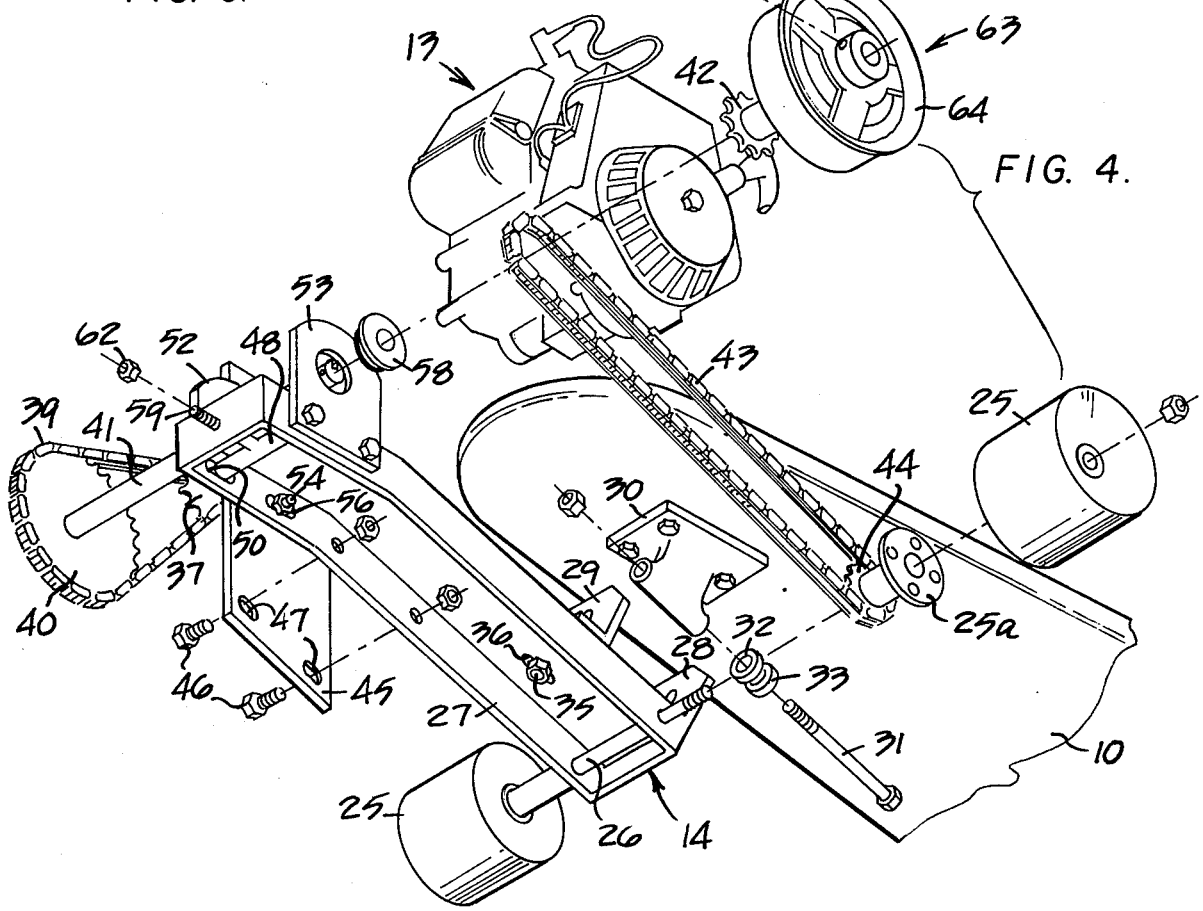
FIG. 4 is an exploded isometric view of the rearward end of the skateboard.

Referring to FIGS. 3 and 4, rear wheel assembly 12 comprises a pair of laterally spaced wheels 25, both of which are freely rotatable on an axle 26 and only one of which is driven by drive train 15. The axle is fixedly mounted on an elongated channel bar 27 of bracket assembly 14 which also mounts motor 13 thereon. Bracket assembly 14 further comprises a pair of longitudinally spaced support brackets 28 and 29 adapted to support the rearward end of rider's platform 10.

In particular, a mounting bracket 30 is secured beneath the platform to pivotally mount the platform on bracket assembly 14 by means of a pivot pin or bolt 31. The bolt extends through an elongated bore, defined in a tubular extension of mounting bracket 30. Brackets 28 and 29 straddle opposite ends of such tubular extension and have holes formed therein to receive the bolt therethrough for pivotally mounting the brackets on support bracket 30.

A nut 34 is secured on a threaded end of bolt 31 to secure the pivot mounting in place. A flat washer 32 and an elastomeric or rubber grommet 33 are mounted on an opposite end of the bolt and disposed between bracket 28 and an end of bracket 30 whereby the grommet may be compressed under a predetermined force to pre-set the degree of pivotal movements of board 10 relative to bracket assembly 14. Bracket 29 is secured on bar 27 by fastening means comprising a bolt 35 extending through a slot 36, formed through the bar, to provide adjustment means for selectively adjusting the longitudinal distance between brackets 28 and 29.

As clearly shown in FIG. 3, a longitudinal axis $a$ of bolt 31, defining the pivot axis for board 10 on bracket assembly 14, is disposed at an acute angle $x$ relative to a longitudinal axis A of the skateboard. Such angle is preferably selected from the range of from 10° to 45° and is shown as approximately 20° in FIG. 3. The diverging disposition of axis $a$ relative to axis A, towards a forward end of the skateboard, facilitates substantial ground clearance beneath a rearward end of bracket assembly 14, having motor 13 mounted thereon, and also aids in disposing the effective weight of the rider and tractive effort on a forward portion of the footprint of rear wheels 25.

Referring to FIGS. 3-7, drive train 15 comprises a first sprocket 37 secured to an output shaft 38 of motor 13. A first endless chain 39 is entrained about sprocket 37 and is further entrained about a second sprocket 40, secured to a countershaft 41. A third sprocket 42 is secured to an opposite end of countershaft 41 and has a second chain 43 entrained thereabout.

The latter chain is further entrained about a fourth sprocket 44, secured to a hub 25a which is further secured to the one driven wheel 25 (FIG. 5). As shown in FIG. 5, both wheels 25 are rotatably mounted on axle 26 by standard bearing assemblies.

In one drive train embodiment of this invention sprockets 37, 40, 42 and 44 had drive teeth numbering nine, forty, eleven and twelve, respectively. With this drive train, the drive ratio from sprocket 37 to sprocket 44 approximated 5:1. Such stepped-down gear ratio can be readily varied by merely changing sprocket 44 to comprise a different number of drive teeth thereon.

FIGS. 3 and 4 illustrate a mounting for motor 13 comprising a mounting bracket 45. The bracket is releasably attached to an outboard side of channel bar 27 by a pair of bolts which extend through elongated slots 47. The bracket and the tension on chain 39 can thus be adjusted upon selective loosening and tightening of the bolts.

Figure 6:
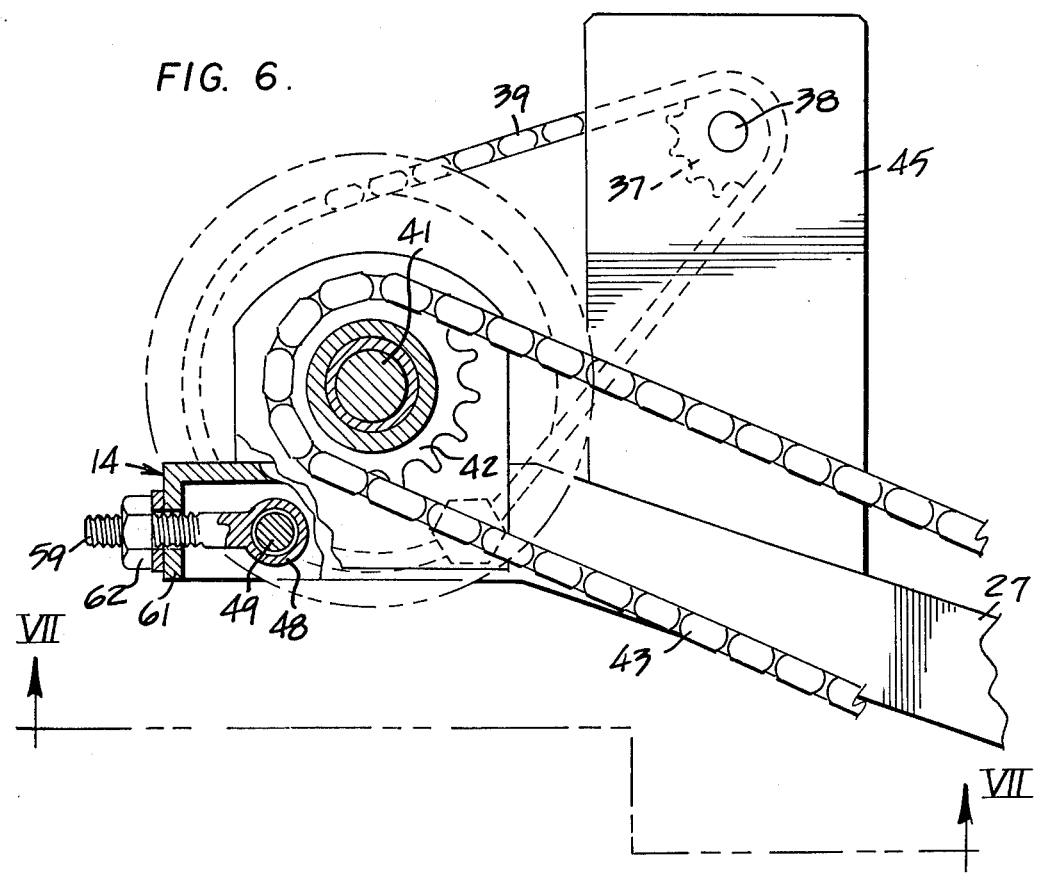
FIG. 6 is an enlarged side elevational view, partially schematic, illustrating an adjustment means employed in the drive train for selectively adjusting the tension on a pair of endless chains employed therein, the view being taken generally in the direction of arrows VI—VI in FIG. 4.
Figure 7:
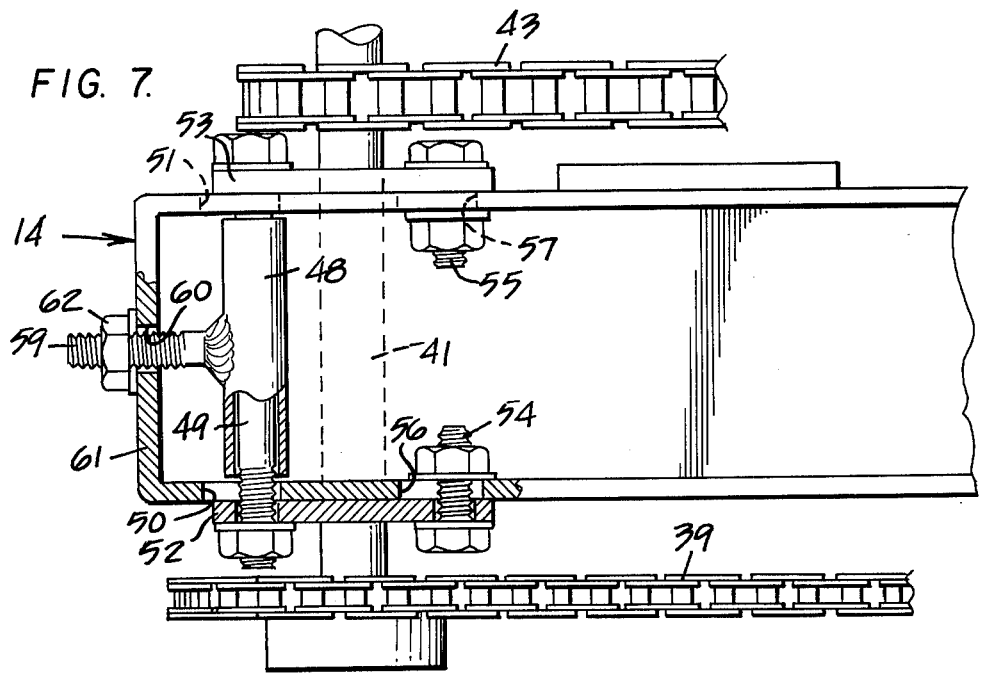
FIG. 7 is a bottom plan view of the adjustment means, taken in the direction of arrows VII—VII in FIG. 6.

FIGS. 6 and 7 more clearly illustrate means for selectively adjusting the final tension on chains 39 and 43. Such adjustment means comprises a T-shaped member 48 having a tubular member mounted on the shank of a bolt 49. The bolt extends through elongated slots 50 and 51, formed through side plates of channel bar 27, and further extends through aligned holes formed through a pair of upstanding plates 52 and 53 disposed in laterally spaced relationship on either side of the channel bar. The plates are further secured to the bracket assembly by a pair of fastening means, comprising bolts 54 and 55 which extend through elongated slots 56 and 57, also formed through side plates of the channel bar.

Countershaft 41 is rotatably mounted on plates 52 and 53, as exemplified by a bearing bushing 58 in FIG. 4 which is adapted to rotatably mount one end of the shaft on plate 52. Member 48 has a threaded stud 59 secured thereon to extend through a hole 60, formed through a back plate 61 of channel bar 27 of bracket assembly 14. A nut 62 is threadably mounted on the stud whereby selective loosening of bolts 49, 54 and 55 will permit rotation of nut 62 to adjust the longitudinal displacement of countershaft 41 relative to the bracket assembly to thus adjust the tension imposed on chains 39 and 43.

Referring to FIGS. 4 and 5, a centrifugally actuated clutch 63 is mounted on countershaft 41 to provide an idling condition of skateboard operation and to also provide a smooth load pickup upon the rider's actuation of throttle control lever 16 (FIG. 1). The clutch may be of a standard design comprising an outer casing 64 suitably secured to sprocket 42. Countershaft 41 extends through the sprocket which is rotatably mounted thereon.

An end of the countershaft is suitably secured by a key and set screw 65 to a hub 41a of the clutch which defines three radial spokes 41b (one shown) circumferentially spaced thereon. A weight 63a, biased inwardly by a tension spring 63b, is disposed between each pair of circumferentially adjacent spokes. When the countershaft exceeds a predetermined speed, the weights will move radially outwardly to frictionally engage casing 64. The clutch will thus engage through centrifugal force to permit the motor to start-up easily and when the countershaft and hub 41a come up to speed, the total torque capacity will increase to couple the hub with the casing to drive sprocket 42.

Engine 13 may constitute a 1.2 horsepower, two-cycle gasoline engine. As shown in FIG. 2, a recoil handle 66, having a rope connected thereto in a conventional manner, is adapted to start the engine upon pulling thereof. A fuel tank 67 is suitably secured beneath rider's platform 10 and a fuel line 68 communicates fuel to the engine. As shown in FIG. 3, throttle control cable 18 is suitably attached to engine speed or throttle control lever 19, the pivoting of which is controlled by lever 16 (FIG. 1). A kill or button switch 69 is mounted on grip 17 and is normally spring-biased to a closed position to ground the magneto (not shown) of the engine to stop the motor. Upon start-up and during a ride, normal grasping of grip 17 will open the switch to permit running of the engine. Should the rider let go of the grip the switch will close automatically to stop the engine.

Figure 8:
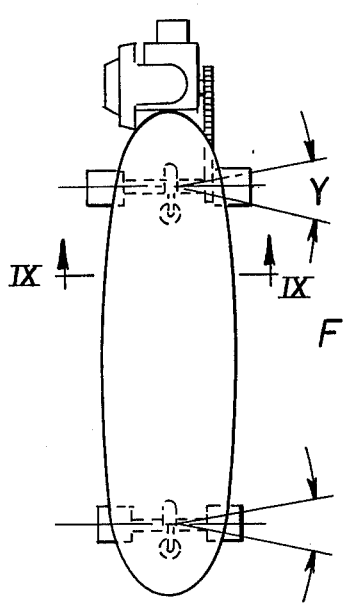
FIG. 8 is a top plan view generally illustrating a conventional motorized skateboard.
Figure 10:
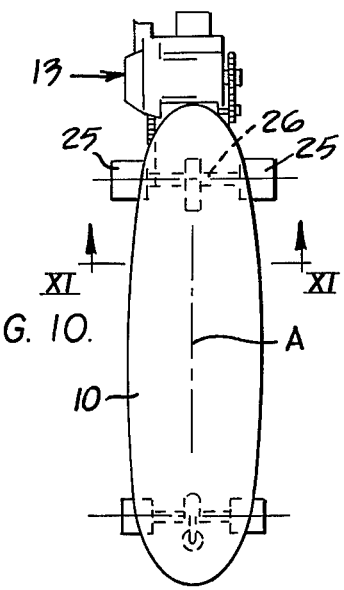
FIGS. 10 and 11 are views similar to FIGS. 8 and 9, respectively, illustrating comparative movements of the platform employed in the skateboard of this invention.
Figure 9:
FIG. 9 is a transverse section, taken in the direction of arrows IX—IX in FIG. 8.
Figure 11:
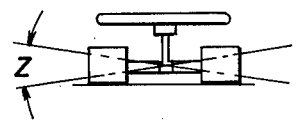

FIGS. 8 and 9 illustrate a conventional skateboard wherein the front and rear wheels thereof are adapted to pivot in a horizontal plane, through an angle Y. As discussed above, such movement of the rear wheels will not only decrease riding stability, but will also reduce the tractive effort of the driven wheel. In contrast thereto, FIGS. 10 and 11 illustrate the skateboard of this invention wherein the rotational axis of wheels 25 on axle 26 will prevent any displacement of the axle relative to its perpendicular disposition relative to longitudinal axis A of the skateboard and only permit the axle to oscillate in a vertical plane through an angle Z. It should be further noted that such angle is substantially greater, i.e., 15°, than the corresponding angle permitted by the rear roadwheels of the conventional skateboard illustrated in FIG. 9.

I claim:
1. A skateboard comprising
a horizontally disposed rider's platform,
a pair of laterally spaced front wheels connected beneath a forward end of said platform,
a pair of rear wheels,
mounting means connecting said rear wheels beneath a rearward end of said platform for solely permitting vertical pivotal movements of said rear wheels about a pivot axis disposed in a vertically disposed plane intersecting a longitudinal axis of said skateboard, said mounting means comprising a bracket assembly pivotally mounted beneath the rearward end of said platform and having said rear wheels rotatably mounted thereon and wherein said bracket assembly extends rearwardly from said rear wheels, motor means, having an output shaft, mounted rearwardly on said bracket assembly and drive means connecting the output shaft of said motor means with only one of said rear wheels for selectively driving the same comprising a first sprocket secured to the output shaft of said motor means, a countershaft rotatably mounted on said bracket assembly, a second sprocket secured to a first end of said countershaft, an endless first chain entrained about said first and second sprockets, a third sprocket secured to a second end of said countershaft, a fourth sprocket connectible with said one rear wheel and an endless second chain entrained about said third and fourth sprockets.

2. The skateboard of claim 1 wherein the pivot axis for said rear wheels is disposed at an acute angle relative to the longitudinal axis of said skateboard and is disposed to diverge relative thereto towards a forward end of said skateboard.

3. The skateboard of claim 1 wherein said angle is selected from the range of 10° to 45°.

4. The skateboard of claim 1 wherein said mounting means comprises a pin pivotally mounted on a mounting bracket secured beneath said platform and wherein the pivot axis for said rear wheels is defined by said pin.

5. The skateboard of claim 4 wherein mounting means further comprises a bracket assembly disposed beneath said platform and mounted on said pin and wherein said rear wheels are rotatably mounted on said bracket assembly.

6. The skateboard of claim 5 wherein said bracket assembly comprises a pair of longitudinally spaced first and second support brackets mounted on opposite ends of said pin and wherein said pin constitutes a bolt having a nut threadably mounted on one end thereof and disposed exteriorly of said first support bracket and elastomeric grommet means mounted on a second end of said bolt and disposed and compressed between said second support bracket and said mounting bracket.

7. The skateboard of claim 6 further comprising adjustment means for selectively adjusting the longitudinal disposition of said first support bracket relative to said second support bracket on said bracket assembly.

8. The skateboard of claim 7 wherein said bracket assembly further comprises a channel bar and wherein said adjustment means comprises an elongated slot formed through said channel bar and a bolt releasably securing said first support bracket to said channel bar for selectively adjusting the longitudinal position of said first support bracket relative to said second support bracket.

9. The skateboard of claim 1 further comprising adjustment means for selectively adjusting tensions on said first and second chains.

10. The skateboard of claim 1 further comprising centrifugally actuated clutch means operatively connectible between said third sprocket and said countershaft for driving said second chain when the speed of said countershaft exceeds a predetermined amount.

11. The skateboard of claim 1 further comprising throttle control means for selectively varying the speed of the output shaft of said motor means, including a pistol grip having a control lever pivotally mounted thereon and a control cable connected between said control lever and a throttle control lever of said motor means.

12. The skateboard of claim 11 further comprising switch means mounted on said pistol grip adapted to be connected to a magneto of said motor means for selectively actuating said motor means.

13. The skateboard of claim 1 wherein said motor means is secured to an upstanding mounting bracket detachably mounted on a side of said brackt assembly.

14. The skateboard of claim 13 further comprising adjusting means for selectively adjusting the longitudinal disposition of said mounting bracket on said bracket assembly.

15. A skatebaord comprising
a horizontally disposed rider's platform,
a pair of laterally spaced front wheels connected beneath a forward end of said platform,
a pair of rear wheels,
mounting means connecting said rear wheels beneath a rearward end of said platform for solely permitting vertical pivotal movements of said rear wheels about a pivot axis disposed in a vertically disposed plane intersecting a longitudinal axis of said skateboard comprising a pin pivotally mounted on a mounting bracket secured beneath said platform and wherein the pivot axis for said rear wheels is defined by said pin and a bracket assembly disposed beneath said platform and mounted on said pin and wherein said rear wheels are rotatably mounted on said bracket assembly, said bracket assembly comprising a pair of longitudinally spaced first and second support brackets mounted on opposite ends of said pin and wherein said pin constitutes a bolt having a nut threadably mounted on one end thereof and disposed exteriorly of said first support bracket and elastomeric grommet means mounted on a second end of said bolt and disposed and compressed between said second support bracket and said mounting bracket, and
adjustment means for selectively adjusting the longitudinal disposition of said first support bracket relative to said second support bracket on said bracket assembly.

16. A skateboard comprising
a horizontally disposed rider's platform,
a pair of laterally spaced front wheels connected beneath a forward end of said platform,
a pair of rear wheels,
a bracket assembly mounted beneath the rearward end of said platform and having said rear wheels rotatably mounted thereon and wherein said bracket assembly extends rearwardly from said rear wheels,
motor means, having an output shaft, mounted rearwardly on said bracket assembly, and
drive means connecting the output shaft of said motor means with one of said rear wheels for selectively driving the same comprising a first sprocket secured to the output shaft of said motor means, a countershaft rotatably mounted on said bracket assembly, a second sprocket secured to a first end of said countershaft, an endless first chain entrained about said first and second sprockets, a third socket secured to a second end of said countershaft, a fourth sprocket connectible with said one rear wheel and an endless second chain entrained about said third and fourth sprockets.

* * * * *